US005961644A

United States Patent [19]
Kurtzberg et al.

[11] Patent Number: 5,961,644
[45] Date of Patent: Oct. 5, 1999

[54] METHOD AND APPARATUS FOR TESTING THE INTEGRITY OF COMPUTER SECURITY ALARM SYSTEMS

[75] Inventors: Jerome M. Kurtzberg; Menachem Levanoni, both of Yorktown Heights, N.Y.

[73] Assignee: International Business Machines Corporation, Armonk, N.Y.

[21] Appl. No.: 08/933,657

[22] Filed: Sep. 19, 1997

[51] Int. Cl.$^6$ ................................................ G06F 12/14
[52] U.S. Cl. ...................................... 713/200; 713/201
[58] Field of Search ........................... 395/186, 187.01; 364/222.5, 286.4; 326/8; 380/4; 713/200, 201, 202; 714/25, 33, 41, 45

[56] References Cited

U.S. PATENT DOCUMENTS

| | | | |
|---|---|---|---|
| 3,931,504 | 1/1976 | Jacoby | 235/153 R |
| 4,672,572 | 6/1987 | Alsberg | 364/900 |
| 5,414,833 | 5/1995 | Hershey et al. | 395/575 |
| 5,509,076 | 4/1996 | Sprunk | 380/25 |
| 5,796,942 | 11/1998 | Esbensen | 395/187.01 |

OTHER PUBLICATIONS

Mounji et al., "Continuous Assessment of a Unix Configuration: Integrating Intrusion Detection and Configuration Analysis", IEEE, pp. 27–35, Feb. 1997.

Puketza et al., "A Methodology for Testing Intrusion Detection Systems" IEEE, pp. 719–729, Oct. 1996.

Chung et al., "Simulating Concurrent Intrusions for Testing Intrusion Detection Systems; Parallelizing Intrusions" IEEE, pp. 173–183.

Polk, "Automated Tools for Testing Computer System Vulnerability" http://csrc.ncsl.nist.gov/secpubs/, Dec. 1992.

ISS, "Securing Operating Platforms: A solution for tightening system security", Internet Security Systems, Inc., pp. 1–11, Jan. 1997.

Fisher, "A Look at Satan", http://ciac.llnl.gov/ciac/notes/Notes07.shtml, CIAC Notes No. 95–07B, pp. 1–7, Apr. 1995.

Curry, "Improving the Security of your Unix System", ITSTD–721–FR–90–21, SRI International, pp. 1–51, Apr. 1990.

Farmer et al., "Improving the Security of your Site by Breaking Into it", comp.security.unix, pp. 1–19, Dec. 1993.

Farmer et al., "The COPS Security Checker System", Purdue University Technical Report CSD–TR–993, pp. 1–14, Jan. 1994.

Kim et al., "Writing, Supporting and Evaluating Tripwire: A Publically Available Security Tool" Purdue Technical Report CSD–TR–94–019, pp. 1–23, Mar. 1994.

*Primary Examiner*—Robert W. Beausoliel, Jr.
*Assistant Examiner*—Stephen C. Elmore
*Attorney, Agent, or Firm*—McGinn & Gibb, P.C.; Stephen C. Kaufman, Esq.

[57] ABSTRACT

Apparatus and method for testing the integrity of computer alarm systems which can be part of a computing network, includes testing the computer alarm system by simulating an attack on the computing network including the alarm system itself. Thereafter, information, pertaining to the status of the computing network alarm system attendant upon the simulated attack, is registered.

20 Claims, 3 Drawing Sheets

METHOD AND APPARATUS FOR TESTING THE INTEGRITY OF COMPUTER SECURITY ALARM SYSTEMS

FIELD OF THE INVENTION

This invention relates to a method and apparatus for testing the integrity of computer security alarm systems.

BACKGROUND OF THE INVENTION

Known methods and forms pertinent for safeguarding the integrity of computer systems include, inter alia, password verification procedures, alarms enabled by several consecutive unauthorized log-ons, safeguards employable against multiple legitimate users at the same time, and safeguards employable against invasion of computer viruses, enabled by searching for specific code and data patterns of specific known viruses.

SUMMARY OF THE INVENTION

Our work centers on a critique of the capabilities and viability of the foregoing representative methods and forms for safeguarding the integrity of computer systems, to an end of disclosing novel methodology and apparatus which can advantageously improve or complement their performance.

In this regard, we have found that all of these representative methods and forms rely on an implicit antecedent assumption. That is, the security methods and forms themselves, necessarily manifest a requisite effectiveness and reliability. However, this assumption, without more, may be naive, and failure to realize it may render nugatory (e.g., worthless, invalid, inoperative, etc.) an entire security program.

Based on the present inventors' recognition of the above problem, a novel method and apparatus are provided for testing the integrity of computer security alarm systems, thereby protecting a computer system (network) from unauthorized penetration.

In a first aspect, the novel method is suitable for testing the integrity of computer alarm systems which can be part of a computing network, and includes testing the computer alarm system by simulating an attack on the computing network including the alarm system itself, and registering information pertaining to the status of the computing network alarm system attendant upon the simulated attack.

In a second aspect, the novel apparatus is suitable for testing the integrity of computer alarm systems which can be part of a computing network, and includes a tester for testing the computer alarm system by simulating an attack on the computing network including the alarm system itself, and a register for registering information pertaining to the status of the computing network alarm system attendant upon the simulated attack.

Preferably, the alarm testing system is embedded as a software package in a single computer, or in all of the nodes, and preferably used to test all computer nodes. The security alarm system is therefore preferably on line, and operates in real time.

The testing of the security alarm system comprises simulating an attack, as discussed above, and observing if the security system responds with recognition of the attack and generation of an appropriate alarm.

Thus, with the invention the integrity of a computer system can be tested reliably to improve or complement the system's performance.

BRIEF DESCRIPTION OF THE DRAWINGS

The invention is illustrated in the accompanying drawings, in which.

DETAILED DESCRIPTION OF THE INVENTION

The detailed description of the invention proceeds by first elaborating preferred computer network structures suitable for realizing the method and apparatus of the present invention, as summarized above. Then, secondly, functional aspects of the method are discussed, with particular emphasis on five representative classes or types of invasion and attempted invasion of computer security. Thirdly, function details of a security alarm tester are set forth, followed, fourthly, by attack simulation details, examples, and flowchart realization of the present method.

Structure

Figure 1:
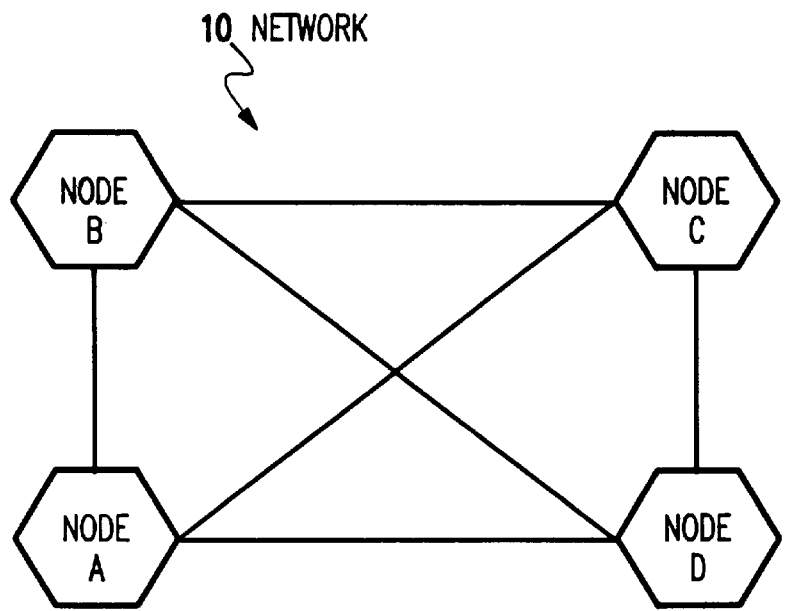
FIG. 1 shows a computing network.

Preferred realization of the present method and apparatus may be effected by a conventional processor system comprising a single computer or a network of connected computers. For example, FIG. 1 shows a network 10, where each node (A, B, C, D) in the network represents a computer. The detailed description that follows references a single processor for the sake of convenience.

Figure 2:
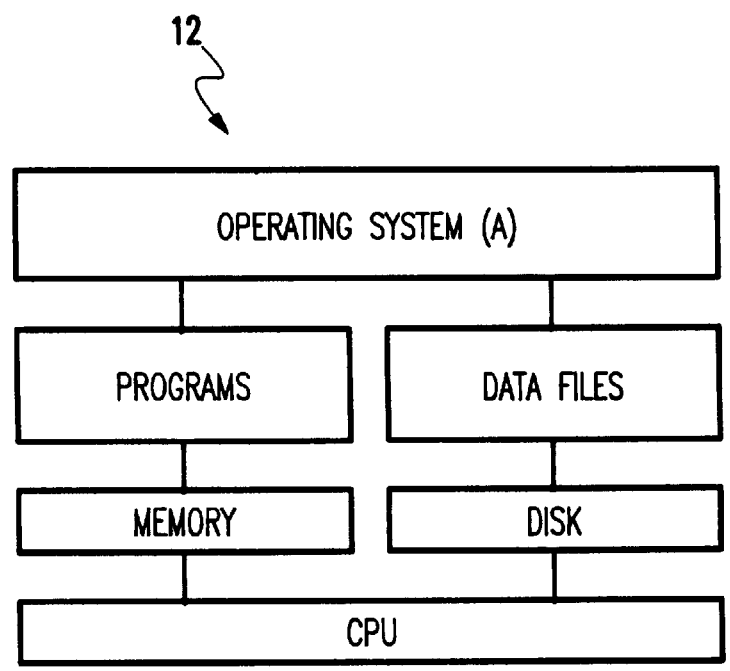
FIG. 2 shows a typical processor system comprising either a single computer or a network of connected computers, the processor system containing programs and data files which are embedded in an operating system A.

FIG. 2 shows a typical processor 12 containing programs and data files typically associated with an operating system (A).

Figure 3:
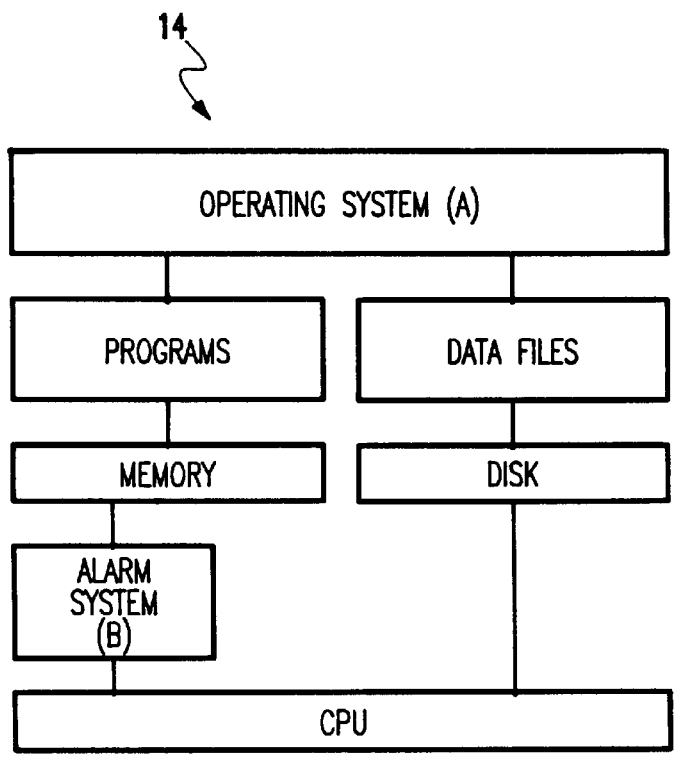
FIG. 3 shows the FIG. 2 processor system including an embedded alarm system B for determining if the security and integrity of the processor system is violated or not.

FIG. 3 shows a processor 14, substantially the same as the FIG. 2 processor 12, but further comprising an embedded alarm system B. The function of the alarm system is to determine if the security and integrity of the processor 14 is violated or not. Functional details of the alarm system B are set forth, below.

Figure 4:
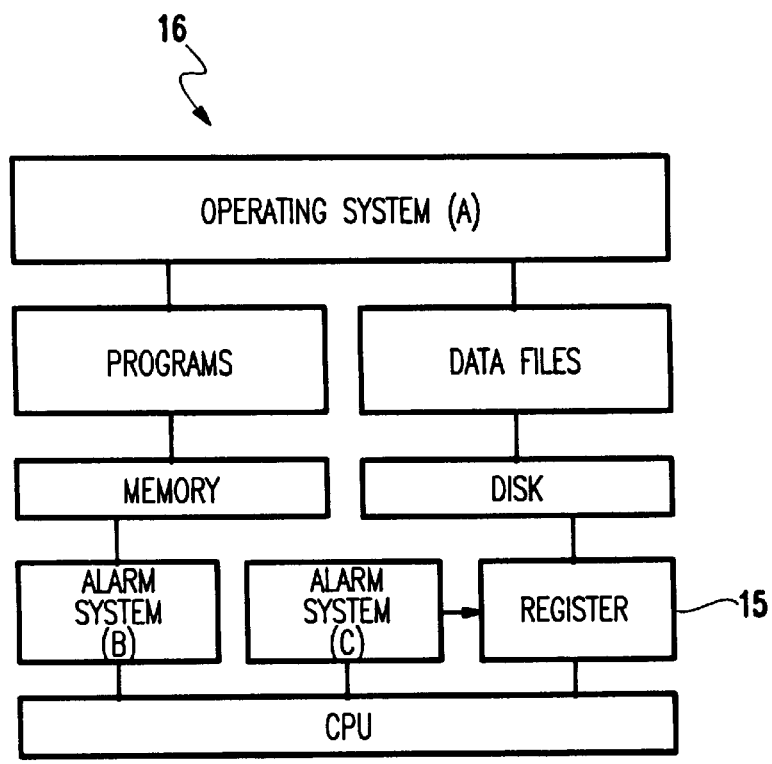
FIG. 4 shows an alarm testing system C which is also embedded in a computer system.

FIG. 4 shows a processor 16, substantially the same as the FIG. 3 processor 14, but further comprising a security alarm testing system C (a salient component of the present invention) and a register 15 for registering information pertaining to the status of the alarm system C attendant upon a simulated attack. The security alarm testing system preferably is connected to the operating system, and preferably is capable of providing input to the operating system and also operating on programs and data files via the operating system, all by way of known conventional techniques.

Figure 5:
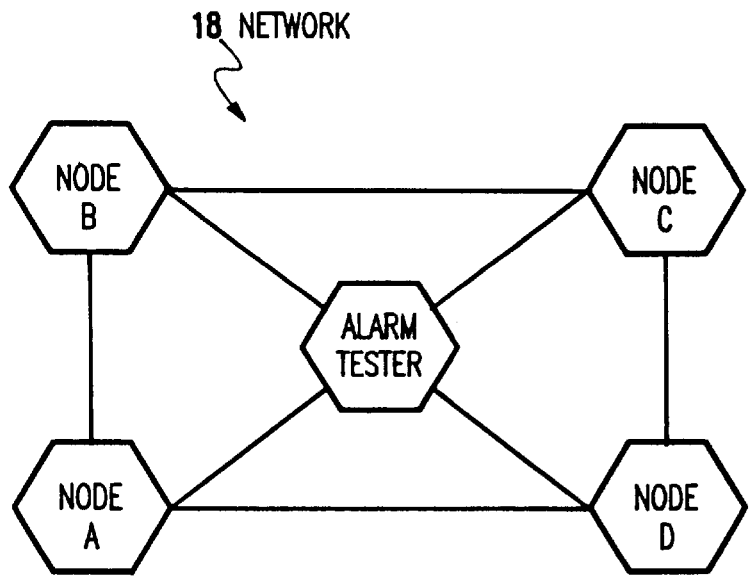
FIG. 5 shows the FIG. 1 computing network with an additional processing node that can serve as a security alarm tester for implementing the alarm testing simulated attacks.

FIG. 5 shows a network 18 similar to that shown in FIG. 1, but with an additional processing node that can serve as a security alarm tester for implementing the alarm testing simulated attacks.

Function

The computer alarm system of the type referenced in FIG. 3, preferably checks for various types of invasion of and attempted invasion of computer security. Five illustrative classes of invasion are considered below:

(i) a user attempting to log on with a false password. If the number of attempted log-ons reaches a specified number, an error message may be recorded, and an alarm may be given to the security manager.

(ii) a user with legal ID (identification) and password attempts to log on, but that user ID is already in use; i.e., no more than one legal ID can be operational at any one time in the computer.

(iii) a legitimate user on the system attempts to go beyond his authorized scope (e.g., accessing unauthorized files), or run programs which he is not authorized to run.

(iv) modifications of programs or data files without authorization.

(v) unauthorized transmission of programs or data files to another user or to another node outside the computer network.

Function Details of the Security Alarm Tester

The security alarm tester preferably will own a set of user IDs and passwords. The security alarm system may be tested by means of simulated attack on the computer system. The five classes of attacks are preferably simulated at random times, preferably provided each day preferably by a random number generator. Both the times of attack and the types of attack preferably are generated randomly.

If the alarm system is functioning, the security manager must receive alarms at these times, and records of this attack must be present. For example, at a time specified by the random number generator, the tester will simulate any one of the available attacks (e.g., try to logon twice with the same ID). An alarm will be sent to the security manager, and a new record will be added to the security log file in register 15. Attacks of domain violations, unauthorized modifications, illegal transmissions etc., will be simulated randomly. The use of random time—different ones for each day, inhibits a real attack from taking advantage of knowledge of prior alarms.

Attack Simulation Details and Examples

As mentioned above, the alarm testing system preferably is embedded as a software package in a single computer, or in all of the nodes, and preferably used to test all computer nodes. The security alarm system is therefore preferably on line, and operates in real time.

The testing of the security alarm system comprises simulating an attack, as discussed above, and observing if the security system responds with recognition of the attack and generation of an appropriate alarm.

Specifically, the following steps are preferably executed:

(i) a set of pairs (e.g., a set including at least one group of paired first and second elements), one element representing the type of attack that is to take place, and the other representing a "random" time at which the attack is to take place. This set of attack-pairs can be dynamically generated, with a record of it supplied to the security manager, or the entire set of pairs can be supplied in advance by the operator or system.

(ii) at the appropriate time Ti supplied by the current attack-pair, the specified attack Ei supplied by the current attack-pair, is executed. For example, a set of false passwords (e.g., incorrect passwords) for a legitimate user (namely, an ID owned by the security tester), which exceeds the permissible limit is used to try to logon to the system, or a specific code and data pattern for a known virus is injected into the system.

(iii) the response of the security alarm system (if any) is noted. Does the security system register an attack of the given type? If so, are the appropriate messages sent to the appropriate personnel? and are proper records of the attack maintained?

If the attack was detected by the security system, note that fact and go to the next attack to be executed at the next specified time.

If the attack succeeds and is not detected by the computer system security mechanism, then the security manager is notified, alarms are set off, and the appropriate records are generated.

(iv) at the time specified by the time element in the next attack-pair execute step (ii).

The above steps are preferably to be executed on line in real time. If desired, the attacks can be simulated at off-shift real time.

Figure 6:
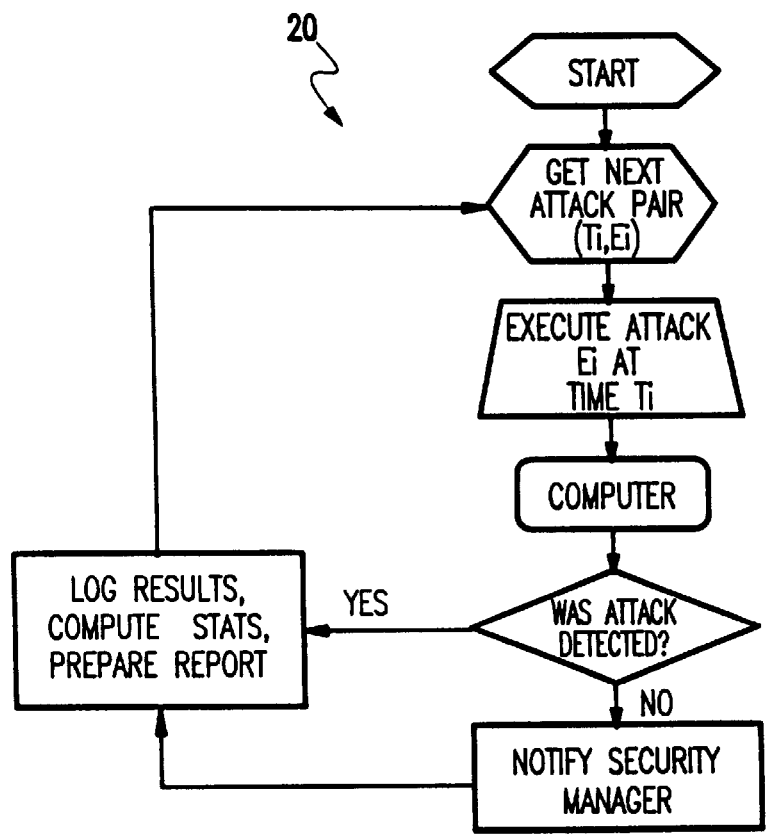
FIG. 6 presents a flowchart pertinent to the method of the present invention.

FIG. 6 presents a flow chart 20 of the above four steps.

What is claimed is:

1. A method for testing the integrity of a computer alarm system which is one of associated with a computer and part of a computing network, the method comprising:

testing the computer alarm system by dynamically and actively simulating an attack on the computing network including the alarm system itself; and registering information pertaining to the status of the computing network alarm system attendant upon the simulated attack during said testing.

2. The method according to claim 1, wherein a knowledge of vulnerabilities of one of said computer and said computing network are unknown prior to testing said computer alarm system.

3. The method according to claim 1, wherein said attacks are simulated on said one of said computer and said computing network to determine a performance of said computer alarm system.

4. The method according to claim 1, wherein said simulated attack comprises:

determining whether a user is attempting to log-on with a false password; and determining a number of times said user attempts said log-on with said false password.

5. The method according to claim 4, further comprising:

when a number of attempted log-ons reaches a predetermined number, recording an error message in said register, and providing an alarm.

6. The method according to claim 1, wherein said simulated attack comprises at least one of:

determining whether a user with a legal identification and password attempts to log on, and whether said identification and said password are already in use; and determining whether a legitimate user on the system attempts to one of access unauthorized files, and run programs which the user is not authorized to run, wherein when any one of said identification and said password are already in use, and when the user attempts to one of access unauthorized files, and run programs which the user is not authorized to run, an error message is recorded in said register, and an alarm is provided.

7. The method according to claim 1, wherein said simulated attack comprises:

determining whether a modification has occurred of one of a program and a data files without authorization.

8. The method according to claim 7, further comprising:

when it is determined that the modification has occurred, recording an error message in said register, and providing an alarm.

9. The method according to claim 1, wherein said simulated attack comprises:

determining whether unauthorized transmission of programs or data files to another user or to another node outside the computer network, has occurred.

10. The method according to claim 9, further comprising:

when the unauthorized transmission has occurred, recording an error message in said register, and providing an alarm.

11. The method according to claim 1, wherein said testing uses a set of user IDs and passwords, and wherein said attacks are simulated at random times, such that both a time of attack and a type of attack are generated randomly.

12. Apparatus for testing the integrity of a computer alarm system which is one of associated with a computer and part of a computing network, the apparatus comprising:

a tester for testing the computer alarm system by dynamically and actively simulating an attack on the computing network including the alarm system itself; and a register for registering information pertinent to the status of the computing network alarm system attendant upon the simulated attack by said tester.

13. The apparatus according to claim 12, wherein said tester has a set of user IDs and passwords, and wherein said attacks are simulated at random times, such that both a time of attack and a type of attack are generated randomly.

14. The apparatus according to claim 12, wherein said tester is embedded as a software package in one of said computer system and in all nodes of the computing network.

15. The apparatus according to claim 12, wherein said tester and said security alarm system are on line, and operate in real time.

16. The apparatus according to claim 12, said tester includes a set of pairs of elements comprising at least one group of paired first and second elements, said first element representing a type of attack to occur, and said second element representing a random time at which the attack is to occur.

17. The apparatus according to claim 16, wherein each group of paired first and second elements is dynamically generated, with a record of it supplied to the register.

18. The apparatus according to claim 16, wherein an entire set of pairs is supplied in advance.

19. The apparatus according to claim 12, wherein a knowledge of vulnerabilities of one of said computer and said computing network are unknown by said tester prior to testing dynamically and actively said computer alarm system.

20. The apparatus according to claim 12, wherein said attacks by said tester are simulated on said one of said computer and said computing network to determine a performance of the alarm system.

* * * * *